US005558889A

United States Patent [19]

Rossi

[11] Patent Number: 5,558,889
[45] Date of Patent: Sep. 24, 1996

[54] ADDITIVES FOR ANIMAL NUTRITION AND TECHNIQUE FOR THEIR PREPARATION

[75] Inventor: Jean Rossi, Bellevue, Switzerland

[73] Assignee: Crina S.A., Gland, Switzerland

[21] Appl. No.: 309,675

[22] Filed: Sep. 21, 1994

[30] Foreign Application Priority Data

Oct. 5, 1993 [CH] Switzerland ............................ 3000/93

[51] Int. Cl.⁶ ...................................................... A23K 1/00
[52] U.S. Cl. ................................. 426/89; 426/96; 426/635
[58] Field of Search ................................. 426/89, 92, 93, 426/96, 97, 291, 623, 630, 635

[56] References Cited

U.S. PATENT DOCUMENTS

| | | | |
|---|---|---|---|
| 4,066,562 | 1/1978 | Wollensak | 426/635 |
| 4,211,795 | 7/1980 | Leroy | 426/635 |
| 4,218,490 | 8/1980 | Phillips | 426/656 |
| 4,921,705 | 5/1990 | Arai et al. | |

FOREIGN PATENT DOCUMENTS

| | | |
|---|---|---|
| 1461364 | 11/1966 | France . |
| 1516055 | 1/1968 | France . |
| 2502906 | 10/1982 | France . |
| 2577936 | 8/1986 | France . |
| 892855 | 4/1962 | United Kingdom . |
| WO92/18014 | 10/1992 | WIPO . |
| WO93/19621 | 10/1993 | WIPO . |
| WO93/19622 | 10/1993 | WIPO . |

*Primary Examiner*—Daniel J. Stemmer
*Attorney, Agent, or Firm*—Young & Thompson

[57] ABSTRACT

This invention pertains to a composition of additives for animal feed which includes a solution of volatile and/or irritating products in a liquid coagulating agent which is adsorbed on a vegetable and/or mineral carrier in particles. This carrier is, at least partially, coated with coagulated protein particles bound to this same carrier in order to diminish the free contact area of the carrier. The additive composition can be advantageously blended with premixes or with animal feed.

9 Claims, No Drawings

ADDITIVES FOR ANIMAL NUTRITION AND TECHNIQUE FOR THEIR PREPARATION

This invention refers to additives for animal nutrition and process for preparation, as well as for animal feeds containing these additives, For various reasons (improvement of digestibility, taste, etc.), animal feeds often contain additives with a volatile compound base, such as alcohols, aldehydes, cetones and aliphatic or aromatic esters, etc., and/or stingy and "hot" flavors contained for example in capsicum, peppers, mustards, horseradish, ginger, etc.

Due to their volatile nature, however, these compounds evaporate easily when the packaging is opened or when the additives are mixed with other feed. For example, a loss of approx. 20% is noticed when proceeding to a dilution of 1% in a mineral feed premix.

On the other hand, these compounds often smell very strongly and are aggressive to human skin, and then present an important inconvenience to employees manipulating these additives when preparing animal feed.

The objective of this invention is to provide a composition of additives as mentioned above, but with none of their inconveniences. The objective of this invention is obtained by a composition of additives for animal feed—as first part of the invention—which consists of a solution in a liquid coagulating agent of volatile and/or irritant products absorbed on a vegetable and/or mineral carrier as particles. This carrier being, at least partially, coated with coagulated protein particles bound to this same carrier in order to diminish its free contact area.

As second objective of this invention is the process for the preparation of this composition of feed additives, characterized by the following:

The volatile and/or aggressive products are dissolved in a first coagulating agent composed of at least one substituted phenol, The solution obtained is absorbed on particles of a mineral and/or vegetable carrier, A coagulable protein is blended by mixing with the mass obtained, Water is then sprayed onto this mass in the presence of a second coagulating agent.

The third objective of this invention is the animal feed containing the above mentioned feed additives.

All types of volatile products and/or hot and irritating flavors can be used in this invention as far as they are authorized for animal feed.

As an example of volatile compounds, we can mention alcohols such as creosol, guaïacol, thymol, eugenol, etc., aldehydes such as salicylaldehyde, benzaldehyde, cinnamaldehyde, etc., ketones such as decalactone, undecalactone, etc., aliphatic or aromatic esters such as methyl-, ethyl-, butyl-, amyl-, etc. as acetates, butyrates, caproates, benzoates, cinnamates, salicylates, etc.

The "hot" and stingy compounds can be found in capsicum, peppers, mustards, horseradish, ginger, etc., such as capsaicin, piperin, gingerol, shogaol, allyl isothiocyanate, etc.

As absorbing carrier usable in this invention, we can mention vegetable carriers such as carboxymethylcellulose, sawdust, etc. and/or mineral carriers such as vermiculite, expanded silica, kaolin, etc.

These carriers are generally particles—spherical shaped or not—measuring approximately 0.1 to 1.5 mm.

The protective "coating" bound to the carrier aims at diminishing the evaporation contact area, while at the same time diminishing the evaporation of the volatile and/or aggressive products, is made of an agglomerate of microparticles or microspheres (diametre approx. 50 to 200 μm) of coagulated proteins, for example casein, milk powder, lactalbumin, egg albumin, blood protein, a vegetable protein such as soybean protein, etc.

The technique for preparing the additives according to this invention preferably comprises the following steps:

A substituted phenol used as first coagulating agent (internal coagulant) chosen for example among the cresols, guaïacol, benzenediols, thymol, creosol, eugenol, etc., is added to the volatile and/or aggressive products. The substituted phenol amount to approx. 50 to 90% of the solution, preferably as cresols and/or resorcinol; This solution is absorbed on particles or powder of a mineral and/or vegetable carrier;

A coagulable protein is blended with the mass obtained, then,

Either add a tannin powder (tannic acid) and/or an oak bark powder, as second coagulating agent ("external" coagulant). The mass is then sprayed with water;

Or spray an aqueous solution of a second inorganic coagulant agent such as a double aluminium potassium sulfate (alum); and finally store during 48 to 72 hours and rehomogenize the final product.

As mentioned above, the second coagulating agent or external coagulant can be added directly to the mass before spraying (tannin powder or oak bark powder) or simultaneously (aqueous alum solution).

The various steps of the technique are generally carried out in an ordinary feed mixer or in a screw mixer, preferably with slow rotating speed.

All the steps of the technique of this invention can be carried out at room temperature, generally between 15° and 30° C. If the temperature falls below 15° C., the time needed to carry out these steps should be extended (by 10 to 20% below 10° C.); and storage period prolonged by 24 to 48 hours, if temperature falls below 15° C.

The final product (additive) will then show the following ratio of the various constituents (weight %):

| | |
|---|---|
| Vegetable carrier | 10–40 |
| Mineral carrier | 0–20 |
| Solution of volatile and/or aggressive products | 20–30 |
| Coagulated proteins | 10–30 |
| Coagulating agent | 2–5 |
| Water | 5–15 |

The additives, according to the invention, can then be blended with the vitaminized feed premixes and/or with concentrated animal feed.

The invention is now illustrated according to the following examples.

EXAMPLES 1

Add 5 to 50 g. of cresols:and 1 to 20 g. resorcinol to a 200 g. solution of volatile products, as for example, the following aromatic mixture.

| Aromatic mixture: | |
|---|---|
| Thymol | 25–35% |
| Guaiacol | 10–15% |

-continued

| Aromatic mixture: | |
|---|---|
| Eugenol | 5–10% |
| Vanilline | 10–20% |
| Salicylaldehyde | 5–10% |
| Limonene (solvent) | 20–35% |

This solution is absorbed in a 450 g. mixture of sawdust (90%) and expanded silica (10%) by mixing in a feed or screw mixer for 2 to 15 min. The product obtained is then added to 200 g. of skim milk powder or casein by mixing for 2 to 15 min. The quantity of the added product can vary between 100 and 250 g. according to the conditions and the nature of the coagulable protein.

50 g. of powdered tannin is then blended with the mass and mixed during 2 to 15 minutes. The amount of tannin can vary between 20 and 100 g. according to the quality of the tannin and the quantity of coagulable proteins. The tannin can also be replaced by an inorganic coagulant, for example, aluminium potassium sulfate (alum) dissolved in water and added during the following step of the technique. Finally, 50 g. of water, eventually containing an inorganic coagulant, are sprayed onto the mass during the final phase of the mixture which will last approximately another 5 to 20 minutes.

The product should then preferably be packed in waterproof bags and stored during 48 to 72 hours; it is recommended to rehomogenize by simply mixing the product, after the preliminary storage period.

EXAMPLE 2

25 g. of capsaicin and 25 g. of piperine (irritating products), or only 50 g. of capsaicin are dissolved into 125 g. of m-cresol (or 100 to 200 g.). The solution obtained is absorbed in 250 g. (200–400 g.) of sawdust or carboxymethylcellulose in a feed or screw mixer for 2 to 15 min.

The following products are then added to the mixture in the order mentioned below and each product is blended for 2 to 15 min.

25 g. of a resorcinol solution in m-cresol (1:4) (or 10 to 50 g. resorcin);

100 g. of milk powder (100–300 g.) or casein;

Eventually 25 g. of tannin (10–50 g.); and eventually 250 g. sawdust (or carboxymethylcellulose) (up to 500 g.).

Finally, 75 g. of water (50–150 g. ) are sprayed onto the mass obtained. To this amount of water 5 to 10 g. of alum are added, if tannin was not added in the previous step.

The product is again mixed for 5 to 15 minutes after spraying and is then preferably packaged in waterproof bags and stored at room temperature during 48 to 72 hours. After this intermediate storage period, the product is rehomogenized in the mixer (5 to 15 minutes). It can also be blended with a mixture of volatile products (example 1) in a proportion of 5 to 20%.

EXAMPLE 3

The additives obtained, as described in examples 1 and 2, can be diluted by blending with concentrated feed preparations or "premix"; as an example, see the following composition:

| Additive according to the invention | 0.3–3% |
|---|---|
| Vitamin mixture (A, B, D, E, nicotinic acid, etc.) | 0.1–1% |
| Mineral salts (CaHPO$_4$, CaCO$_3$, NaCl, CuO, MnO, FeSO$_4$, ZnO, etc.) | 25–75% |
| Cereal by-products (bran, middlings, etc.) | 21–75% |

Still, and only as an example, the premix mentioned above can in a final stage, be blended with the following preparation to produce animal feed:

| Premix | 0.3–3.5% |
|---|---|
| Cereals and peas | approx. 50% |
| Oil cake (soya bean, rapeseed, etc.) | approx. 25% |
| Cereal by-products | 21–25% |

According to the invention, the feed additives have the advantage that they do not allow rapid evaporation of the volatile products that they contain, this is due to the partial "coating" of the absorbent carriers by an agglomerate of microparticles of coagulated proteins. For example, in the case of a premix containing 1% of the additive according to the invention, with a base of volatile products, the evaporation loss is lower than 10%, whereas in a known preparation containing the same volatile products, the evaporation loss is in the range of 20%.

On the other hand, we notice another advantage with the additives according to the invention, and that is when using strong smelling products or products aggressive to human skin. With the additives, these reactions are considerably diminished.

For example, when a classical absorbant containing 5.% capsaicine is in contact with human skin for a few minutes, it will after one hour, provoque a red blemish on the skin, 2 to 3 times larger than the contact size. On the other hand, the additive according to the invention (also containing 5% capsaicin) under the same conditions, will provoke a slight pinkish spot the same size, if not smaller, than the contact size.

I claim:

1. A process for the production of a feed additive composition having reduced emission of a feed additive component, comprising dissolving at least one feed additive component in a first coagulating agent comprising at least one substituted phenol to form a solution, absorbing said solution on a particulate carrier, blending a coagulable protein with the particles of carrier with said solution absorbed thereon to form a material, and spraying water onto said material in the presence of a second coagulating agent.

2. A process as claimed in claim 1, wherein said substituted phenol is selected from the group consisting of cresol, guaiacol, benezenediol, thymol, creosol and eugenol, said substituted phenol being present in an amount of 5 to 20% by weight of the composition.

3. A process as claimed in claim 1, wherein said second coagulating agent is admixed with said material before said spraying step.

4. A process as claimed in claim 3, wherein said second coagulating agent is selected from the group consisting of tannin and oak bark.

5. A process according to claim 1, wherein said second coagulating agent is admixed with said water before said spraying step.

6. A process according to claim 5, wherein said second coagulating agent is a double aluminum potassium sulfate.

7. A process according to claim 1, further comprising storing said composition in waterproof packaging for at least two days.

8. A process according to claim 7, further comprising rehomogenizing the stored composition by mixing after said storing step.

9. A process according to claim 1, wherein said feed additive component is selected from the group consisting of alcohols, aldehydes, ketones, aliphatic esters, aromatic esters, capsaicin, piperin, gingerol, shogaol, and allyl isothiocyanate.

* * * * *